W. E. C. PETERSEN.
CHARTOMETER.
APPLICATION FILED MAY 21, 1920.
1,416,380.
Patented May 16, 1922.
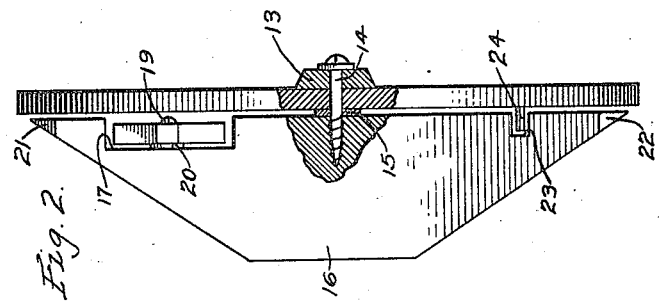
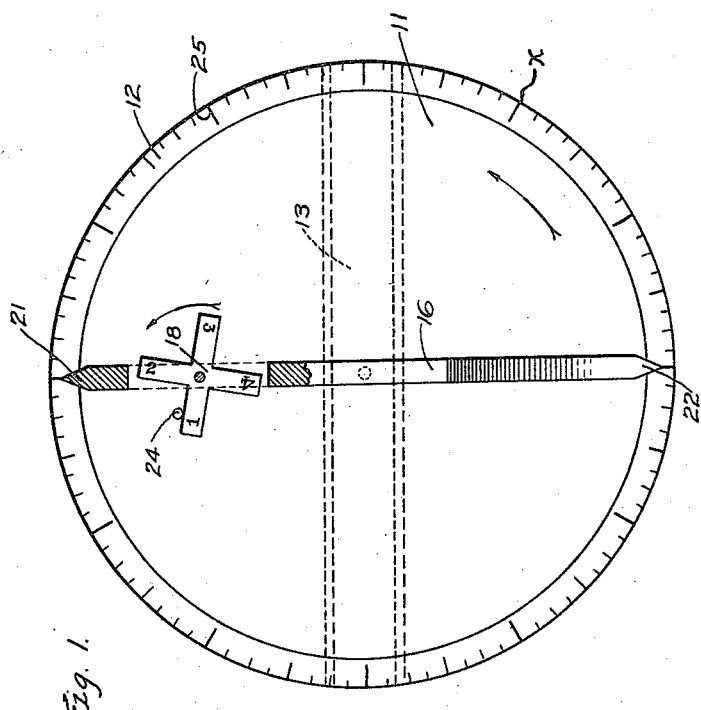
Inventor
W. E. C. Petersen
By Munn & Co.
attys.

UNITED STATES PATENT OFFICE.

WALTER EJLERT CHRISTIAN PETERSEN, OF CHICAGO, ILLINOIS.

CHARTOMETER.

1,416,380.  Specification of Letters Patent.  Patented May 16, 1922.

Application filed May 21, 1920. Serial No. 383,042.

*To all whom it may concern:*

Be it known that I, WALTER E. C. PETERSEN, a citizen of the United States, and a resident of Chicago, in the county of Cook and State of Illinois, have invented a new and useful Improvement in Chartometers, of which the following is a full, clear, and exact description.

My invention relates to improvements in measuring devices and it consists in the combinations, constructions and arrangements herein described and claimed.

An object of my invention is to provide a novel form of a measuring device for quickly and accurately determining the distance between points on scale drawings, charts, and the like.

A further object of my invention is to provide a device of the type described that is compact in form and which can be readily operated by one person to accurately measure the distance between any two points shown on a scale drawing without the necessity of marking the drawings in any way.

A further object of my invention is to provide a device of the type described that is relatively simple in construction and operation and which is not likely to get out of order easily.

A further object of my invention is to provide a device of the type described that is thoroughly practical commercially.

Other objects and advantages will appear in the following specification, and the novel features of the invention will be particularly pointed out in the appended claims:

My invention is illustrated in the accompanying drawings, forming part of this application, in which—

Fig. 1 is a plan view of the device, a portion being broken away for clearance.

Fig. 2 is a side view of the device, a portion being broken away and shown in section.

In carrying out my invention, I provide a disk 11 having a scale 12 delineated thereon around its outer edge. The scale is graduated to read counterclockwise beginning with the point $x$, as best seen in Fig. 1, graduating marks 25 being provided as shown. The scale 12 is preferably divided into 50 divisions of ¼ inch each, since commercial drawings are ordinarily drawn to a ¼ inch scale. It will of course be understood that the distance between the graduating marks may be assumed to represent any desired unit, as for instance, one foot.

A reenforcing member 13 is rigidly secured to one side of the disk 11, as shown, to prevent warping of the same. A screw 14, or the like, extends through the reenforcing member 13, the center of the disk 11 which is mounted for rotation thereon, and has its end embedded in an indicator 16, which has the form shown in the drawings. A washer 15 is disposed between the indicator 16 and the disk 11 to maintain the same in spaced relation with respect to each other.

A recess 17 is provided in the under surface of the indicator 16. A cruciform member 18 is disposed therein, being pivotally connected with the indicator 16 by means of a screw 19, or the like. A washer 20 is disposed between the cruciform member 18 and the indicator 16 to prevent free rotation of the former.

It will be noted that the indicator 16 is diametrically disposed with respect to the disk 11 and that its opposite ends taper into needle points 21 and 22 which are positioned to indicate graduations on the scale 12.

The indicator 16 is formed with a second recess 23 which is located diametrically opposite to the recess 17. A pin 24 carried by the disk 11 is received within the recess 23 when the disk 11 is in the position pictured in Figure 2.

From the foregoing description of the various parts of the device, the operation thereof may be readily understood. The indicator 16 is grasped by the hand and the device is placed in a desired position on the drawing, blue print, or the like. The drawing, blue print, of the like, would be disposed on a table in an ordinary manner. The needle point 22 would be placed directly above the starting point, the indicator 16 being in an upright position with the disk 11 resting on its edge. At this time, the point $x$ on the scale will register with the needle point 21. The distance to any given point on the blue print, drawing or chart may then be determined by maintaining the indicator 16 in vertical position and by rolling the disk 11 until the needle point 22 is directly above the given point. The needle point 21 will then indicate on the scale 12 the distance between the two given points shown on a drawing or chart. When the disk 11 has completed a half revolution, the pin 24 will engage one of the arms of the cruciform member 18 and will turn the same ¼ revolution, the pin 24 being positioned to engage successively the arms of the cruciform member 18 in consecutive revolutions as each arm is moved into its upper vertical position. The arms of the cruciform member 18 are numbered in order. Consequently the number of revolutions completed by the disk 11 may be determined at any time by glancing at the cruciform member 18.

One of the main advantages of the device lies in the fact that considerable distances may be measured without the necessity of marring the drawing by marks or the like to indicate the successive steps in the measuring process. The device may be operated by one person without assistance and provides a practical and efficient means for accomplishing the results ordinarily obtained by the use of a measuring device of an ordinary construction. It is obvious that many modifications and adaptations of the form of the device shown in the accompanying drawings may be provided without departing from the spirit and scope of the invention as disclosed in the foregoing and outlined more particularly in the appended claims. I therefore consider such adaptations and modifications as my own.

I claim:

1. A measuring device comprising a disk having a scale delineated around its outer edge, an indicator diametrically disposed with respect to said disk and pivotally connected therewith, whereby the distance traversed by the peripheral edge of said disk may be determined, a pin projecting from said disk and means for indicating the number of revolutions completed by said disk, said last named means comprising a cruciform member positioned to be engaged by said pin, whereby said cruciform member is rotated ¼ revolution for each revolution completed by the disk.

2. A measuring device comprising a disk having a scale delineated around its outer edge, an indicator diametrically disposed with respect to said disk and pivotally connected therewith, whereby the distance traversed by the peripheral edge of said disk may be determined, a pin projecting from said disk and means for indicating the number of revolutions completed by said disk, said last named means comprising a rotatable member having a plurality of radially extending arms positioned to be engaged successively during successive revolutions of the disk by said pin.

WALTER EJLERT CHRISTIAN PETERSEN.